United States Patent [19]

Meyer et al.

[11] Patent Number: 4,611,044

[45] Date of Patent: Sep. 9, 1986

[54] POLYURETHANE CARPET BACKING CATALYZED WITH ORGANOIRON AND ORGANOBISMUTH CATALYSTS

[75] Inventors: Louis W. Meyer; Linda M. McKinney; Don H. Kelley, all of Lake Jackson, Tex.

[73] Assignee: The Dow Chemical Company, Midland, Mich.

[21] Appl. No.: 737,984

[22] Filed: May 28, 1985

[51] Int. Cl.$^4$ ............... C08G 18/14; C08G 18/22
[52] U.S. Cl. ............................. 528/56; 528/55; 528/57; 528/58; 521/124
[58] Field of Search ............... 528/55, 56, 57, 58; 521/124

[56] References Cited

U.S. PATENT DOCUMENTS

| | | | |
|---|---|---|---|
| 3,136,731 | 6/1964 | Piechota et al. | 528/53 |
| 3,476,933 | 11/1969 | Mendelsohn | 260/2.5 |
| 3,799,898 | 3/1974 | Lamplugh et al. | 260/2.5 |
| 3,821,067 | 6/1974 | Taylor et al. | 428/423.1 |
| 4,151,345 | 4/1979 | Hillegass | 528/56 |
| 4,292,411 | 9/1981 | Jourquin et al. | 521/51 |
| 4,483,894 | 11/1984 | Porter et al. | 521/112 |

OTHER PUBLICATIONS

Cosan Chemical Corporation, Technical Information Sheet: "Cosat 83", Carlstadt, N.J. (Feb. 11, 1986).

Primary Examiner—Herbert S. Cockeram
Attorney, Agent, or Firm—Gary C. Cohn

[57] ABSTRACT

This invention is an improvement in a process for preparing a polyurethane backed substrate whereby a reacting polyurethane forming mixture comprising at least one polyahl and at least one polyisocyanate as applied to a substrate and subsequently curing thereon to form an attached polyurethane backing. The improvement which is this invention comprises employing an organoiron or organobismuth catalyst for said polyurethane forming mixture. The organoiron or organobismuth catalyst is employed in an amount such that the polymer forming mixture exhibits the viscosity of not greater than about 20,000 cps 2 minutes after the polyahl and polyisocyanates are contacted in the presence of said catalyst at 20°-50° C. and the polyurethane forming mixture cures to a tack free state at an elevated temperature in the presence of said catalyst in less than about 8 minutes.

15 Claims, No Drawings

POLYURETHANE CARPET BACKING CATALYZED WITH ORGANOIRON AND ORGANOBISMUTH CATALYSTS

BACKGROUND OF THE INVENTION

This invention relates to polyurethane backings for substrates, more particularly polyurethane backings for carpet which exhibit desirable curing times.

Polyurethane backings are commercially applied to a variety of substrates, the most significant of which are floor and wall coverings such as carpet. One commonly used procedure for preparing such a backing is to position the substrate with its underside up, place a pool or puddle of a liquid urethane forming reaction mixture on to the substrate, gauge the reaction mixture with a doctor blade or similar device to form a film and then cure the gauged film. The liquid urethane reaction mixture is generally applied to the substrate at approximately ambient or slightly elevated temperatures (i.e. 20°–50° C.). However, since the reaction mixture contains catalyst, it often begins to cure before it is gauged.

This curing presents several problems. As the viscosity of the curing reaction mixture rises, it becomes more difficult to gauge the film.

The curing reaction mixture also sticks to the coating apparatus and forms "strings" which disrupt the uniformity of the backing. In addition, this premature curing of the reaction mixture decreases the adhesion of the urethane backing to the substrate, since the higher viscosity thereof reduces the penetration of the reaction mixture into the surface of the substrate.

On the other hand, it is highly desirable from an economics standpoint that the urethane backing cure as quickly as possible once it is gauged and heated to the proper curing temperature. Long cure times delay further processing steps in the production of the backed substrate. Generally, it is desired that the reaction mixture cure to a tack-free state in 10 minutes or less at the desired curing temperature.

Generally, control of the rate of the curing reaction is effected by the use of catalysts. Catalysts such as organotin catalysts and tertiary amine catalysts have been conventionally used in preparing polyurethane carpet backing. Unfortunately, however, the use of these catalysts in conventional amounts generally causes the polyisocyanates and isocyanate-reactive materials to react too rapidly to permit the application and gauging steps to be carried out. Accordingly, it has been attempted to slow the rate of cure simply by reducing the amount of the catalyst used. Although this does sufficiently retard the cure to permit the application and guaging steps, it also substantially increases the time required to cure the mixture to a tack-free state. In addition, using lower levels of these catalysts causes the polyurethane to inadequately adhere to the substrate. Other catalysts, such as mercury and lead catalysts, provide desirable reactivities but are undesirable due to their substantial toxicity.

It would therefore be desirable to provide a catalyst for a polyurethane backing formulation which provides a desired rate of reaction and produces a polyurethane backing which adequately adheres to the substrate.

SUMMARY OF THE INVENTION

This invention is an improvement in a process for preparing a polyurethane backed substrate whereby a reacting polyurethane forming mixture comprising at least one polyahl and at least one polyisocyanate is applied to a substrate and subsequently cured thereon to form an attached polyurethane backing. The improvement which is this invention comprises employing an organoiron or organobismuth catalyst for said polyurethane forming mixture. The organoiron or organobismuth catalyst is employed in an amount such that the polymer-forming mixture exhibits a viscosity of not greater than about 20,000 cps 2 minutes after the polyahl and polyisocyanates are contacted in the presence of said organoiron or organobismuth catalyst at about 20°–50° C., and the polyurethane forming mixture cures at 100°–150° C. to a tack free state in less than about 8 minutes after the polyisocyanates and polyahl are contacted in the presence of said organoiron or organobismuth catalyst.

The use of the organoiron or organobismuth catalyst according to this invention provides a polyurethane reaction mixture which cures sufficiently slowly at ambient temperature or slightly elevated temperature to enable the practitioner to apply and gauge the reacting mixture onto a substrate such as a carpet, and which also becomes tack free in a relatively short period of time. In addition, this invention provides a method whereby excellent binding of the backing to the substrate is achieved. When a carpet or other material comprising a substrate having a pile woven or tufted therethrough is coated according to its invention, it provides the further advantage of securing the woven or tufted pile to the substrate.

DETAILED DESCRIPTION OF THE INVENTION

In this invention, a polyurethane forming material is catalyzed with an organoiron or organo-bismuth catalyst and applied to form a layer on a substrate.

The organoiron or organobismuth catalyst useful herein is represented by the structure

wherein M is iron or bismuth, and each R represents an organic radical which contains no substituent groups which adversely interfere with the reaction of an isocyanate group and an active hydrogen containing material. Such group is advantageously alkyl, a saturated or unsaturated carboxyalkyl, or a a pentanedione radical, i.e.

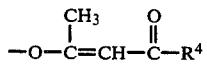

wherein $R^4$ is alkyl, inertly substituted alkyl, or an inertly substituted derivative thereof.

Preferred are the iron pentanediones, and bismuth carboxylates. An especially preferred iron catalyst is ferric acetylacetonate. The most preferred bismuth catalyts are bismuth salts of $C_8$–$C_{22}$ carboxylic acids, particularly the $C_8$–$C_{18}$ carboxylic acids, and especially $C_8$–$C_{12}$ branched, saturated, tertiary carboxylic acids. An exemplary bismuth catalyst of the most preferred type is commercially available as Coscat 83, sold by Cosan Chemical Corporation.

The catalyst is employed in an amount such that from the time the polyahl and polyisocyanates are contacted in the presence thereof at least two minutes and about 20°–50° C. are required for the reaction mixture to achieve a viscosity of 20,000 cps, and no more than 8 minutes are required for the reaction mixture to reach a tack free state upon curing at about 100°–150° C. The particular amount employed will depend, of course, upon the temperature at which the polyurethane forming mixture is reacted as well as a particular polyols and polyisocyanates employed therein. In general, a lesser amount of catalyst is required when higher temperatures are employed or when the polyahl comprises an amine functional compound. By contrast, at lower polymerization temperatures, or when polyols are employed, somewhat greater amounts of catalysts may be necessary. Typically, from about 0.001 to about 0.2 percent by weight of the organoiron or organobismuth catalyst, based on the weight of polyahls employed in the polyurethane forming mixture, are suitable to provide the desired reactivity. Preferably, the amount of catalyst is from about 0.005 to 0.1 weight percent.

The polyurethane forming material employed to prepare the polyurethane backing comprises at least one polyisocyanate and at least one polyahl. The term "polyahl" as employed herein refers to any compound having a plurality of hydrogen atoms which due to their position on the molecule display significant activity according to the Zerewitnoff test described by Kohler in the Journal of American Chemical Society Vol. 49, page 3181 (1927). Suitable such polyols include for example, polyols, polyamines, polymercaptans, polyacids, and the like, with polyamines and polyols in particular being preferred. Polyols are most preferred. Said polyahl advantageously has a functionality from about 2 to about 8, preferably from about 2 to about 3, and more preferably about 2.0 to about 2.2. Especially suitable polyahls include polyether polyols, polyester polyols, the so-called copolymer polyols and amine terminated polyethers.

Generally, a mixture of at least one relatively high equivalent weight polyahl and at least one relatively low equivalent weight polyahl are employed in the polyurethane forming mixture. Said relatively high equivalent weight polyahl advantageously has an equivalent weight from about 500 to about 5000, preferably from about 600 to about 2000. Said relatively low equivalent weight polyahl advantageously has an equivalent weight of less than about 400, preferably less than about 200 and includes materials such as ethylene glycol, tripropylene glycol, propylene glycol, 1,4-butane diol, diethylene glycol, 1,3-propane diol, triethylene glycol, tetraethylene glycol, tetrapropylene glycol, 4,4'-diaminodiphenylmethane, 3,3'-dichloro-4,4'-diaminodiphenyl methane, 4,4'-diaminobiphenyl, trimethyolpropane mixtures thereof and the like. Mixtures of polyahls which are suitable for preparing backings for substrates and particular for preparing carpet backing are described in a number of patents including for example U.S. Pat. Nos. 3,755,212, 3,862,879, 3,821,130, 3,821,067, 4,296,159, and 4,483,894 all are which are incorporated herein by reference.

A preferred polyol mixture comprises a substantially difunctional poly(propylene oxide) having an equivalent weight from about 600 to 2000 which may be capped with ethylene oxide, and a polyhydroxyl-containing low equivalent weight polyahl having a functionality of about 2. In an especially preferred system, substantially all of the polyahls employed in the polyurethane forming mixture are substantially difunctional.

The polyurethane forming mixture further comprises at least one polyisocyanate. Suitable polyisocyanates for use herein are organic polyisocyanates containing from about 2 to about 4, preferably from about 2 to 3 isocyanate or isothiocyanate groups per molecule or mixture thereof. Suitable polyisocyanates include for example, m-phenylene diisocyanate, toluene-2,4-diisocyanate, toluene-2,6-diisocyanate, hexamethylene-1,6-diiosocyanate, tetramethylene-1,4-diisocyanate, cyclohexane-1,4-diisocyanate, hexahydrotoluene diisocyanate (and isomers thereof), naphthlene-1,5-diisocyanate, 1-methoxyphenyl-2,4-diisocyanate, diphenylmethane-4,4'-diisocyanate, 4,4'-diphenylene diisocyanate, 3,3'-dimethoxy-4,4'-diphenyldiisocyanate, 3,3'-dimethyl-4,4'-diphenyl diisocyanate, and 3,3'-dimethyldiphenylpropane-4,4'-diisocyanate, diverse polymethylene polyphenyl polyisocyanates and the like. Crude polyisocyanates may also be employed herein such as the crude toluene diisocyanate obtained by the phosgenation of a mixture of toluene diamines or the crude diphenyl methylene diisocyanate obtained by the phosgenation of crude diphenyl methylene diamine. Suitable such crude polyisocyanates are disclosed in U.S. Pat. No. 3,215,652. Of the foregoing, preferred are aromatic diisocyanates such as toluene diisocyanate and diphenylmethane diisocyanate or mixtures of the latter having an average functionality of about 2.0 to about 2.7. Most preferred are diphenylmethane diisocyanate, or derivatives thereof having an average functionality of about 2.0–2.2. These most preferred polyisocyanates are known in the art to be especially difficult to catalyze to obtain the proper reactivity.

The polyisocyanate is generally employed in an amount such that there are provided from about 0.9 to about 1.3, preferably about 0.95 to about 1.15 equivalents of isocyanate per equivalent of reactive hydrogen present in the polyurethane forming mixture.

In addition to the aforementioned polyahls and polyisocyanates, the polyurethane reaction mixture also advantageously and preferably contains a quantity of an inorganic filler such as, for example, calcium carbonate, alumina trihydrate, antimony trioxide, titanium dioxide, carbon black or mixtures thereof. Said inorganic filler is employed in an amount ranging from about 0 to about 500 parts by weight per 100 parts of polyahls employed in the urethane forming mixture and preferably from about 40 to about 400 parts per 100 parts of polyahl.

In addition, various optional components such as flame retardants including halogenated hydrocarbons, and phosphate esters; pigments; antioxidants; preservatives and other additives known to be useful in forming polyurethanes may optionally be employed herein. If desired, the polyurethane forming material and hence the polyurethane backing may be frothed or foamed according to processes described in U.S. Pat. Nos. 3,821,130, 3,862,879 and 4,296,159. Such frothing is generally obtained by mechanically inducing an inert gas into the foam forming composition. A foam backing is typically provided by employing a blowing agent such as a low boiling halogenated hydrocarbon, water or other gas-producing substance into the polyurethane reaction mixture.

Suitable processes for applying a polyurethane backing to a substrate are disclosed, for example, in U.S. Pat. Nos. 4,278,482 and 4,397,978.

The polyurethane reaction mixture is advantageously applied to a substrate by forming a mixture of the polyahls, polyisocyanates, catalyst as described herein and other components as desired, contacting said mixture with at least one surface of said substrate and gauging the applied polyurethane reaction mixture to form a layer of desired thickness. Said gauging operation is advantageously performed with an apparatus such as a doctor blade or cutting blade which in addition to adjusting the thickness of the layer also effects the penetration of the layer into the underlying substrate. This is of particular importance when the substrate is a carpet wherein excellent penetration of the reacting polyurethane reaction mixture into the fibers of the carpet is desirable. Before or after contact with the substrate, the polyurethane reaction mixture is advantageously heated to an elevated temperature to promote curing. The temperature used for curing will depend somewhat on the particular reactants employed, the level of catalyst and the desired rate of reaction. Typically it is from about 50 to about 200, preferably about 100°–150° C., more preferably about 100° to 130° C. The use of the catalyst employed in this invention permits the temperature and other parameters to be adjusted such that the desired cure times are achieved while also providing a desirable tack free time and providing a backing which strongly adheres to the substrate.

In the preparation of carpet tile the polyurethane backing may be employed as a series of two or more layers which may in turn be interposed by one or more fiberglass or polyethylene scrims. In such carpet tiles, the total weight of the polyurethane backing is advantageously from about 15 to about 100 ounces per square yard.

The following examples are intended to illustrate the invention but not to limit the scope thereof. All parts and percentages are by weight unless otherwise indicated.

of about 1000 and a hydroxyl functionality of about 2. To this is added 15 grams of dipropylene glycol, 100 grams of alumina trihydrate and 105 grams of calcium carbonate. These materials are thoroughly mixed and then blended with 63 grams of an isocyanate-terminated prepolymer which is prepared by reacting 86 parts methylene diphenyldiisocyanate with 14 parts of tripropylene glycol. This prepolymer has an —NCO content of about 23 percent and an equivalent weight of about 180. The resulting reaction mixture has an —NCO:OH ratio of about 1.1 (110 index). After blending the prepolymer with the polyol mixture, 1 gram of a 2000 molecular weight polyoxypropylene glycol solution containing the indicated amount of catalyst is blended in. The reaction mixture is then doctored unto the back of a commercial grade carpet made of nylon fibers weighing about 22 ounces per square yard tufted through a woven polypropylene primary backing at the rate of about 7.5 stitches per inch. This carpet has a pile height of about 1.56 inches and a griege weight of about 25 ounces per square yard. After applying the reaction mixture to the carpet, it is allowed to cure at 120° C. The time required for the reaction mixture to reach 20,000 cps viscosity (at room temperature) (using Brookfield viscometer using a No. 4 spindle at 6 revolutions per minute), and the tack free time are measured. After complete curing, the tuft lock is tested according to Federal Test Method Standard DFL-22. The time required to reach 20,000 cps viscosity, the tack free time and the tuft lock for each of Sample numbers 1, 2 and 3 and (Comparative Sample Nos. A, B, and C are reported in the following table.

TABLE

| Sample No. | Catalyst | Catalyst Conc. (wt %) | Reactivity (min)[1] | Tack free[2] time (min) | Tuft Lock (lb) |
|---|---|---|---|---|---|
| 1 | ferric acetylacetonate | 0.03 | 5.0 | 4 | 23 |
| 2 | ferric acetylacetonate | 0.01 | 6.0 | 4 | 24 |
| 3 | bismuth carboxylates[3] | 0.06 | 5.5 | 5.5 | 24 |
| A* | dimethyltin dilaurate | 0.03 | 1.5 | 4 | 22 |
| B* | dimethyltin dilaurate | 0.01 | 5.0 | 4 | 16 |
| C* | nickel acetylacetonate | 0.03 | 20 | >10 | 10 |

*Not an example of this invention.
[1]Time required to reach 20,000 cps at room temperature.
[2]Time required to acheive a tack-free state at 120° C.
[3]Bismuth salt of $C_9$-$C_{11}$ tertiary saturated carboxylic acid.

EXAMPLE

Six duplicate polyurethane backed carpet samples are prepared, Sample Nos. 1, 2 and 3 being prepared according to this invention and Comparative Sample Nos. A, B and C being prepared according to conventional processes. In Sample No. 1, ferric acetylacetonate is employed at a level of about 0.03 parts by weight based on the weight of polyols employed. In Sample No. 2, ferric acetylacetonate is employed at a level of 0.01 percent by weight. In Sample No. 3 a bismuth salt of "Versatic" acid (a mixture of saturated tertiary $C_9$–$C_{11}$ monocarboxylic acids) is employed at a level of 0.06 parts by weight. Comparative Sample No. A uses as a catalyst dimethyl tin dilaurate at a concentration of 0.03 parts by weight. Comparative Sample No. B also uses dimethyltindilaurate at a concentration of 0.01 parts by weight. Comparative Sample No. C is prepared using nickel acetylacetonate as a catalyst at a concentration of 0.03 parts by weight.

In preparing each of the samples and comparative samples the following general procedure is employed.

To a suitable beaker is added 85 grams of a liquid polyoxypropylene glycol having an equivalent weight It can be seen from the data indicated in the Table that only the organoiron and organobismuth catalysts, provide the required reactivities and tack-free times and still provide excellent tuft lock as well.

What is claimed is:

1. In a process for preparing a polyurethane backed substrate whereby a reacting polyurethane forming mixture comprising at least one polyahl and at least one polyisocyanate is applied to a substrate and subsequently cured thereon to form an attached polyurethane backing, the improvement which comprises employing an organoiron or organobismuth catalyst in said polyurethane forming mixture, said organoiron or organobismuth catalyst being employed in an amount such that said polyurethane forming mixture has a viscosity of not greater than 20,000 cps two minutes after the polyurethane forming mixture is contacted with said organoiron or organobismuth at 20°–50° C. and the polyurethane forming mixture reaches a tack free state in less than about 8 minutes upon curing at about 100°–150° C. in the presence of said organoiron or organobismuth catalyst.

2. The process of claim 1 wherein said organoiron catalyst comprises an iron pentanedione.

3. The process of claim 2 wherein said polyahl comprises a mixture of a relatively high equivalent weight polyol having a functionality of from about 2 to about 3 and an equivalent weight from about 600 to about 2000 and a relatively low equivalent weight polyol having a hydroxyl equivalent weight of less than about 200.

4. The process of claim 3 wherein said iron pentadione is employed in an amount from about 0.005 to about 0.1 percent by weight based on the weight of said polyols.

5. The process of claim 3 wherein said polyisocyanate comprises an aromatic polyisocyanate.

6. The process of claim 5 wherein said polyisocyanate comprises a prepolymer or quasi prepolymer prepared by reacting an excess of diphenylmethane diisocyanate or derivative thereof with a low equivalent weight polyol.

7. The process of claim 3 wherein said polyurethane forming mixture further comprises at least one inorganic filler.

8. The process of claim 6 wherein said iron pentadione comprises ferric acetylacetonate.

9. The process of claim 1 wherein said organobismuth compound comprises a bismuth carboxylate.

10. The process of claim 9 wherein said polyahl comprises a mixture of a relatively high equivalent weight polyol having a functionality of from about 2 to about 3 and an equivalent weight from about 600 to about 2000 and a relatively low equivalent weight polyol having a hydroxyl equivalent weight of less than about 200.

11. The process of claim 10 wherein said bismuth carboxylate is employed in an amount from about 0.005 to about 0.1 percent by weight based on the weight of said polyols.

12. The process of claim 10 wherein said polyisocyanate comprises an aromatic polyisocyanate.

13. The process of claim 12 wherein said polyisocyanate comprises a prepolymer or quasi prepolymer prepared by reacting an excess of diphenylmethane diisocyanate or derivative thereof with a low equivalent weight polyol.

14. The process of claim 10 wherein said polyurethane forming mixture further comprises at least one inorganic filler.

15. The process of claim 13 wherein the bismuth carboxylate comprises a bismuth salt of a $C_8$–$C_{12}$ branched carboxylic acid.

* * * * *